United States Patent [19]

Toyota et al.

[11] 4,369,306

[45] Jan. 18, 1983

[54] METHOD FOR TREATING OLEFIN POLYMER FOR REMOVING CATALYST

[75] Inventors: Akinori Toyota; Norio Kashiwa, both of Iwakuni, Japan

[73] Assignee: Mitsui Petrochemical Industries, Ltd., Tokyo, Japan

[21] Appl. No.: 240,404

[22] Filed: Mar. 4, 1981

[30] Foreign Application Priority Data

Mar. 7, 1980 [JP] Japan ................................. 55-27993

[51] Int. Cl.$^3$ ................................................ C08F 6/08
[52] U.S. Cl. ..................................... 528/485; 525/488
[58] Field of Search ................................ 528/485, 488

[56] References Cited

U.S. PATENT DOCUMENTS 3,012,022  12/1961  Reed ..................................... 528/485
4,104,247   8/1978  Kato .................................. 528/485 X Primary Examiner—C. A. Henderson
Attorney, Agent, or Firm—Sherman & Shalloway

[57] ABSTRACT

A method for treating an olefin polymer, which comprises contacting an olefin polymer obtained by polymerizing an olefin in the presence of a catalyst composed of (A) a highly active transition metal compound, (B) an organoaluminum compound and (C) a carbonyl- or Si-containing electron donor, with (D) an organometallic compound of a metal of Groups I to III of the periodic table after the polymerization. This method can markedly reduce the amount of an electron donor remaining in an olefin polymer after polymerization, the electron donor being an ingredient of a catalyst used in the polymerization and constituting the main cause of an offensive odor which the resulting polymer gives off.

10 Claims, No Drawings

METHOD FOR TREATING OLEFIN POLYMER FOR REMOVING CATALYST

BACKGROUND OF THE INVENTION (1) Field of Invention

This invention relates to a method for treating an olefin polymer after polymerization, and more specifically, to a method which by a simple operation, can markedly reduce the amount of an electron donor remaining in an olefin polymer after polymerization, the electron donor being an ingredient of a catalyst used in the polymerization and constituting the main cause of an offensive odor which the resulting polymer gives off.

More specifically, this invention relates to a method for treating an olefin polymer, which comprises contacting an olefin polymer obtained by polymerizing an olefin in the presence of a catalyst composed of (A) a highly active transition metal compound, (B) an organoaluminum compound and (C) a carbonyl- or Si-containing electron donor, with (D) an organometallic compound of a metal of Groups I to III of the periodic table after the polymerization.

In the present application, the term "polymerization" may sometimes denote both homopolymerization and copolymerization, and the term "polymer", both a homopolymer and a copolymer.

(2) Discussion of Prior Art

An olefin polymer obtained by using an old Ziegler catalyst, for example a catalyst comprising a transition metal compound such as titanium trichloride obtained by reducing titanium tetrachloride with metallic aluminum, an organometallic compound, etc., and an organoaluminum compound contains an unnegligible amount of a catalyst residue attributed to the transition metal or aluminum. To remove the catalyst residue, the polymer must be subjected to a deashing treatment using a lower alcohol, for example.

It is known on the other hand to polymerize an olefin in the copresence of an electron donor as a third component in addition to the aforesaid transition metal compound and the organoaluminum compound in order to regulate the activity of the catalyst and control the stereospecificity or molecular weight of the resulting polymer. In recent years, the development of various types of highly active transition metal compounds having the ability to form an olefin polymer in an amount of at least about 5,000 g per millimole of the transition metal has made it possible to omit the aforesaid deashing treatment. Although the deashing treatment can be omitted in preparing an olefin polymer by polymerizing an olefin in the presence of a catalyst composed of the aforesaid highly active transition metal compound, organoaluminum compound and electron donor, it was newly found that the electron donor remains in the resulting polymer in an amount on the order of about 10 ppm or more, and causes the trouble of giving off an offensive odor in subsequent handling, for example during film formation or injection molding.

No proposal, however, has been made in the past for removing this new trouble. Since a polymer obtained by using a conventional Ziegler catalyst composed of a transition metal compound and an organoaluminum compound contains an unnegligible amount of a metal-containing catalyst residue as stated hereinabove, it has previously been important and essential to remove the catalyst residue, and this removal has usually been performed by using a lower alcohol. As an improvement of the treatment for removing such a metal-containing catalyst residue, there is known a method which comprises first treating the polymer with an alkylaluminum chloride or a boron halide in the presence of a liquid hydrocarbon, and then treating the resulting product with a lower alcohol (see Japanese Patent Publication No. 14787/60 corresponding to British Pat. No. 849,085). This method contemplates the removal of the metal-containing catalyst residue in two steps, and the patent exemplifies the use of an old Ziegler catalyst of low activity composed of titanium trichloride and triethyl aluminum. The patent fails to disclose anything about the use of a highly active transition metal compound as a catalyst ingredient, and also the use of an electron donor as a joint catalyst component. Furthermore, the patent naturally does not give any description or suggestion about the aforesaid new trouble attributed to the electron donor remaining in an olefin polymer which is obtained by polymerizing an olefin in the presence of a catalyst composed of the highly active transition metal compound, organoaluminum compound and electron donor and which requires no treatment for removing a catalyst residue; much less a solution to such a problem.

The present inventors made extensive investigations in order to develop a method which can give a solution to this new problem effectively by an industrially easy operation. These investigations have led to the discovery that when an olefin polymer obtained by polymerizing an olefin in the presence of a catalyst composed of a highly active transition metal compound, an organoaluminum compound and an electron donor is treated after the polymerization with an organometallic compound of a metal of Groups I to III of the periodic table, the electron donor remaining in the polymer in an amount of about 10 ppm or more and constituting the main cause of the trouble of offensive odors can be decreased drastically, and thus, the aforesaid trouble can be removed effectively by an easy treating operation.

It is an object of this invention therefore to provide a treating method which offers a solution to the new technical problem associated with the use of a highly active catalyst.

The above and other objects and advantages of this invention will become apparent from the following description.

DETAILED DESCRIPTION OF INVENTION

The olefin polymer to be treated by the method of this invention is an olefin polymer obtained by polymerizing an olefin in the presence of a catalyst composed of (A) a highly active transition metal compound, (B) an organoaluminum compound and (C) a carbonyl- or Si-containing electron donor.

The catalyst component (A) is a highly active transition metal compound containing a transition metal such as Ti, V, Cr, or Zr, and may be liquid or solid under conditions of use. This component (A) can yield an olefin polymer in an amount of at least about 5,000 g, preferably at least about 8,000 g, per millimole of the transition metal.

The catalyst component (A) needs not to be a single compound. It may be supported on, or mixed with, another compound. Or it may be a complex compound or double compound with another compound.

Many such highly active transition metal compounds (A) and methods for preparation thereof have been known, and can be utilized in the production of the olefin polymer to be treated by the method of this invention. Examples of the highly active transition metal compounds as component (A) are a highly active magnesium-containing titanium compound catalyst component, a cromium catalyst compound catalyst component supported on silica and/or alumina and a zirconium compound catalyst component supported on alumina.

A highly active magnesium-containing titanium compound is an example of an especially preferred catalyst ingredient (A) for use in the invention. A specific example is a solid titanium catalyst component containing an amorphous magnesium halide and having a specific surface area of at least 40 m²/g, preferably 80 to 800 m²/g. For example, U.S. Pat. Nos. 4,069,169, 4,157,435, 4,221,741, 4,079,924 and 4,085,276 disclose a solid highly active magnesium-containing titanium compound catalyst component. Preferably, it also contains an electron donor such as an organic acid ester, an acid halide, an acid anhydride, a ketone, an acid amide, a tertiary amine, an inorganic acid ester, a phosphoric acid ester, a phosphorous acid ester, or an ether. Especially preferably, such a catalyst component (A) contains about 0.5 to about 10% by weight, especially about 1 to about 8% by weight, of titanium and having a titanium/magnesium atomic ratio of from about 1/2 to about 1/150, especially from about 1/3 to about 1/150, a halogen/titanium atomic ratio of from about 4 to about 100, especially from about 6 to about 80, and an electron donor/titanium mole ratio of from 0 to about 10, especially from about 0.2 to about 6.

Example of the organoaluminum compound (B) used in the production of the olefin polymer to be treated by the method of this invention are trialkyl aluminums, alkyl aluminum halides, alkyl aluminum hydrides, alkyl aluminum alkoxides, and mixtures of at least two of these. In these examples, the alkyl group may include those having 1 to 12 carbon atoms; the halide may include chlorides, bromides, etc.; and the alkoxy group may include those having 1 to 12 carbon atoms.

The electron donor (C) used in the production of the olefin polymer to be treated by the method of this invention may be a carbonyl- or Si-containing electron donor, preferably having up to 18 carbon atoms, for example carboxylic acid esters, carboxylic acid salts, carboxylic acid halides, carboxylic acid amides, carboxylic acid anhydrides, inorganic acid esters, carbonic acid esters, ketones, and aldehydes.

Specific examples of the electron donor (C) include carboxylic acid esters having 2 to 18 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, dimethyl terephthalate, ethyl ethoxybenzoate, γ-butyrolactone, δ-valerolactone, coumarine and phthalide; carboxylic acid salts having 2 to 12 carbon atoms, such as magnesium acetate, magnesium benzoate, aluminum p-t-butylbenzoate and sodium benzoate; carboxylic acid halides having 2 to 15 carbon atoms, such as acetyl chloride, benzoyl chloride, toluoyl chloride and anisoyl chloride; carboxylic acid amides having 3 to 18 carbon atoms, such as N,N-dimethylacetamide, N,N-diethylbenzamide and N,N-dimethyltoluamide; carboxylic acid anhydrides having 4 to 18 carbon atoms, such as acetic anhydride, succinic anhydride, tetrahydrophthalic anhydride, benzoic anhydride and phthalic anhydride; carbonic acid esters having 3 to 18 carbon atoms, such as diethyl carbonate, ethylene carbonate and diphenyl carbonate; inorganic acid esters such as ethyl silicate, ethyltriethoxysilane, phenyltriethoxysilane and vinyltriethoxysilane; ketones having 3 to 18 carbon atoms, such as acetone, methyl ethyl ketone, methyl isobutyl ketone, acetophenone, benzophenone, cyclohexanone and benzoquinone; and aldehydes having 2 to 15 carbon atoms, such as acetaldehyde, propionaldehyde, octylaldehyde, benzaldehyde, tolualdehyde and naphthoaldehyde.

The catalyst component (C) may be fed into the polymerization zone separately from or together with the catalyst components (A) and/or (B). Or it may be used in the form of a complex compound (or adduct) with the catalyst component (B), or as a complex compound (or adduct) with another compound, for example a Lewis acid such as aluminum trihalides. When the catalyst component (C) is an aromatic compound, a catalyst residue which gives off a particularly offensive odor tends to remain in the resulting olefin polymer. The method of this invention can be especially effectively applied to such a polymer.

The olefin polymer to be treated by the method of this invention may be obtained by polymerizing an olefin by techniques known per se in the presence of a catalyst composed of (A) the highly active transition metal compound, (B) the organoaluminum compound and (C) the carbonyl- or Si-containing electron donor which have been described hereinabove.

The olefin may, for example, be at least one olefin having 2 to 18 carbon atoms, such as ethylene, propylene, 1-butene, 1-pentene, 1-hexene, 4-methyl-1-pentene, 1-octene, and 1-decene. In performing copolymerization of two or more olefins, a polyene compound such as a diene or triene may be used as a third component. The polymerization can be carried out in the liquid phase or vapor phase in the presence or absence of an inert organic solvent. It is preferable to use about 0.0001 to about 1 millimole/liter, calculated as transition metal, of the catalyst component (A), an amount of the organoaluminum compound (B) which corresponds to an Al/transition metal atomic ratio of from about 2 to about 2,000, and about 0.01 to about 1 mole, particularly about 0.02 to about 0.7 mole, per mole of the component (B), of the catalyst component (C). The polymerization temperature is, for example, about 20° to about 100° C., preferably about 30° to about 90° C., and the polymerization pressure is, for example, 0 to about 100 kg/cm², preferably 0 to about 60 kg/cm². In the polymerization, a molecular weight controlling agent such as hydrogen may be used as desired.

According to the method of this invention, the olefin polymer obtained in the above-mentioned above manner is contacted after the polymerization with (D) an organometallic compound of a metal of Groups I to III of the periodic table.

The compound (D) may, for example, be an organometallic compound having a carbon-metal bond and containing a metal selected from the group consisting of alkali metals, alkaline earth metals and aluminum. Examples of the alkali metals are lithium, sodium and potassium. Examples of the alkaline earth metals include beryllium, magnesium and calcium.

Specific examples of the compound (D) are alkyllithiums, arylsodiums, alkylmagnesiums, arylmagnesiums, alkylmagnesium halides, arylmagnesium halides, alkylmagnesium hydrides, trialkylaluminums, alkylaluminum halides, alkylaluminum hydrides, alkylaluminum alkoxides, and alkyllithium aluminums. In these examples, the alkyl group may be those having 1 to 12 carbon atoms; the alkoxy group may be those having 1 to 12 carbon atoms; the aryl groups may include those having 6 to 20 carbon atoms; and the halide may include chlorides and bromides. Among these compounds (D), the trialkyl aluminums are preferred because they give good results even when used in small amounts.

The amount of the compound (D) used in the method of this invention is, for example, about 0.1 to about 50 moles, preferably about 0.1 to about 10 moles, per mole of the catalyst component (C) added to the polymerization system. Contacting may be carried out, for example, at a temperature of about 20° to about 100° C., preferably about 30° to about 90° C., for a period of about 10 minutes to about 10 hours, preferably about 20 minutes to about 300 minutes.

In performing the method of this invention, the polymer withdrawn from the polymerization system can be contacted with the compound (D) in the substantial absence of an olefin (for example in the complete absence of the olefin, or in the presence of up to about 5% by weight, based on the polymer, of the olefin).

Preferably, the contacting is carried out in the presence of a diluent which does not react with the compound (D). For example, when the polymerization of olefin is carried out in the presence of an inert solvent, the compound (D) may be added directly to the resulting slurry or solution containing the polymer. Or it is possible to remove the inert solvent used in the polymerization and add a diluent and the compound (D) to the olefin polymer. Contacting of the polymer with the compound (D) may also be performed in the substantial absence of a diluent. For example, the compound (D) or a concentrated solution of it may be sprayed onto a powdery olefin polymer obtained by the vapor-phase polymerization, or an olefin polymer obtained by slurry polymerization from which the polymerization solvent has been obtained, or onto an olefin polymer which is obtained by drying such a polymer.

After the treatment with the compound (D), the diluent, if used, may be removed, and the olefin polymer is dried to provide a final product. If desired, the treated polymer may be subjected to further treatments with alcohols, water, epoxides, steam, etc. in order to remove the unreacted compound (D) or for other purposes. Or the treated polymer may be submitted to a granulating step with or without the aforesaid additional treatments, and a small amount of water or an alcohol may be added to an extruder. Or various additives may be incorporated.

The treatment of the polymer with the compound (D) can be performed by a very simple operation and is effective.

The following Examples further illustrate the present invention.

EXAMPLE 1

Preparation of a Ti-containing catalyst component:

Twenty grams of $MgCl_2$, 5.25 g of ethyl benzoate and 3 ml of dimethylpolysiloxane (viscosity 20 centistokes) were charged in a nitrogen atmosphere into a 800 ml. stainless steel (SUS-32) ball mill vessel having an inside diameter of 100 mm, and contacted under mechanical pulverization conditions for 24 hours at an impact acceleration of 7 G. Then, 15 g of the resulting pulverized product was suspended in 150 ml of titanium tetrachloride, and contacted with stirring at 80° C. for 2 hours. The solid portion was collected by filtration. Titanium tetrachloride (150 ml) was added to the solid portion on the filter, and the mixture was stirred at 80° C. for 1 hour. The mixture was filtered and washed fully with fresh hexane.

The resulting solid titanium-containing catalyst component contained 1.7% by weight of Ti, 64.5% by weight of Cl, 20.6% by weight of Mg and 7.1% by weight of ethyl benzoate.

Polymerization:

A 2-liter autoclave was charged with 0.75 liter of hexane, and the inside of the autoclave was purged fully with propylene. Triethyl aluminum (1.125 millimoles), 0.42 millimole of methyl toluate and 0.0225 mg-atom, calculated at Ti atom, of the titanium-containing catalyst component prepared as above, were charged into the autoclave, and 350 Nml of $H_2$ was added. Immediately then, the temperature was raised, and propylene was added continuously at 60° C. and polymerized for 2 hours while maintaining the pressure at 7 kg/cm$^2$-G. The temperature was lowered to 20° C., and the pressure was released over the course of 30 minutes. Then, a part of the polymer slurry was taken out, filtered, and dried to obtain a white powdery polymer. Analysis showed that the polymer had a Ti content of 4.6 ppm, a boiling n-heptane extraction residue of 96.5%, and an MI of 3.6 g/10 min. It was also found that 9.9 ppm of ethyl benzoate and methyl p-toluate remained in the polymer. The polymer slurry after releasing of the pressure was stirred at 60° C. for 3 hours together with 0.34 millimole of triethyl aluminum in a nitrogen atmosphere. The slurry was filtered, and dried. The amount of the remaining esters in the white powdery polymer was measured, and found to be 0.3 ppm. This shows that the treatment of the polymer with the organometallic compound drastically reduced the amount of the remaining ester.

The filtered polymer was taken into a flask, and maintained at 110° C. From the top of the flask, steam was fed at a rate of 0.75 g/g-pp.hr for 10 minutes. After the steam treatment, the amount of the esters in the white polymer was less than 0.1 ppm.

EXAMPLE 2

The same polymerization as in Example 1 was repeated except that triisobutyl aluminum was used instead of the triethyl aluminum and ethyl benzoate was used instead of the methyl p-toluate.

Analysis showed that the resulting white powdery polymer had a Ti content of 4.8 ppm, a boiling n-heptane extraction residue of 94.2% and an MI of 6.9 g/10 min. It was also found that ethyl benzoate remained in an amount of 13.2 ppm in the resulting polymer.

When the polymer was treated with triethyl aluminum in the same way as in Example 1, the amount of the ester in the polymer decreased to 0.2 ppm.

EXAMPLE 3

Example 1 was repeated except that the resulting polymer slurry was treated with 1.125 millimoles of diethyl aluminum hydride instead of 0.34 millimole of triethyl aluminum. Analysis showed that 0.1 ppm of methyl p-toluate remained in the resulting polymer.

EXAMPLES 4 to 10

Preparation of a Ti catalyst component:

A Ti catalyst component was prepared in the same way as in Example 1 except that 5.25 g of ethyl benzoate used in Example 1 was replaced by each of the electron donors shown in Table 1.

Polymerization:

The same polymerization as in Example 1 was carried out except that each of the organoaluminum compounds and each of the electron donors shown in Table 1 were used instead of 1.125 millimoles of triethyl aluminum and 9.42 millimoles of methyl toluate were used. After the polymerization, the polymer slurry was treated with each of the organometallic compounds shown in Table 1. The results are also shown in Table 1.

EXAMPLE 11

Preparation of Ti catalyst component:

[I] Synthesis of spherical $MgCl_2.nEtOH$

A 3-liter autoclave was fully purged with nitrogen gas, and charged with 1.5 liters of purified kerosene, 112.5 g of commercially available $MgCl_2$, 163 g of ethanol and 320 g of Emasol (tradename for a product of Kao Soap K.K., non-ionic surface active agent). The mixture was heated with stirring, and at 125° C., stirred at 600 rpm for 20 minutes. The pressure of the inside of the autoclave was adjusted to 10 kg/cm$^2$-G with $N_2$. The cock directly connected to the autoclave and kept at 125° C. was opened, and the mixture was transferred to a 5-liter glass flask equipped with a stirred containing 3 liters of purified kerosene cooled to −15° C. The amount of the liquid transferred was 1 liter, and the time required for transfer was about 20 seconds. The resulting solid was collected by decantation, and washed fully with hexane to form a carrier. The resulting solid was found to be completely circular by microscopic observation.

[II] Preparation of a Ti-containing catalyst component

A 300 ml. glass flask was charged with 150 ml of $TiCl_4$, and 7.5 g of the solid obtained in [I] and suspended in 15 ml of purified kerosene was added at 20°

TABLE 1

| | Electron donor used in the preparation of Ti catalyst component | | Polymerization | | | | Amount of residues in the polymer | |
|---|---|---|---|---|---|---|---|---|
| | | | Organometallic compound | | Electron donor | | | Electron |
| Example | Type | Amount (g) | Type | Amount (mmoles) | Type | Amount (mmoles) | Ti (ppm) | donor (ppm) |
| 4 | Octyl benzoate | 8.18 | AlEt$_3$<br>AlEtCl$_2$ | 2.7<br>0.675 | Butyl anisate | 1.01 | 4.1 | 14.6 |
| 5 | Ethyl toluate | 11.47 | Al(n-Hex)$_3$ | 1.125 | Octyl benzoate | 0.375 | 3.8 | 11.2 |
| 6 | iso-Amyl ether | 6.63 | Al(i-Bu)$_3$<br>AlEt$_{1.5}$Cl$_{1.5}$ | 0.75<br>0.375 | methyl p-toluate | 0.225 | 2.2 | 8.6 |
| 7 | Ethyl anisate | 5.40 | AlEt$_{2.8}$(OBu)$_{0.2}$ | 3.375 | Ethyl toluate | 0.675 | 4.7 | 15.8 |
| 8 | $\begin{array}{c}CH_3\\|\\H-C-COOC_2H_5\\|\\CH_2\end{array}$ | 1.12 | Al(i-Bu)$_3$ | 2.25 | Methyl benzoate | 0.75 | 4.4 | 12.6 |
| 9 | Ethyl benzoate<br>Si(OEt)$_4$ | 4.84<br>4.37 | AlEt$_3$<br>AlEt$_{1.5}$Cl$_{1.5}$ | 0.75<br>0.375 | Ethyl ethoxy-benzoate | 0.225 | 3.1 | 9.4 |
| 10 | Ethyl toluate<br>Triethyl phosphate | 6.88<br>3.82 | AlEt$_3$ | 3.375 | Methyl toluate | 1.125 | 3.6 | 14.5 |

| | Treatment of the polymer with organometallic compound | | | | |
|---|---|---|---|---|---|
| | Organometallic compound | | Temperature (°C.) | Time (min.) | Amount of the electron donor remaining in the polymer (ppm) |
| Example | Type | Amount (mmoles) | | | |
| 4 | AlEt$_{2.5}$(OEt)$_{0.5}$ | 1.0 | 70 | 120 | 1.2 |
| 5 | Al(n-Hex)$_3$ | 1.125 | 70 | 240 | 1.9 |
| 6 | Al(i-Bu)$_2$H | 0.07 | 60 | 30 | 0.7 |
| 7 | AlEt$_3$ | 1.0 | 60 | 240 | 0.8 |
| 8 | AlEt$_3$<br>AlEt$_2$Cl | 0.9<br>0.5 | 60 | 240 | 1.1 |
| 9 | AlEt$_3$ | 0.07 | 60 | 120 | 1.3 |
| 10 | MAGALA 0.5E (*) | 0.6 | 50 | 240 | 1.5 |

(*)Mg—n-Bu$_2$.2AlEt$_3$, a product of Texas Alkyls Co.

C. with stirring. Then, 1.83 ml of ethyl benzoate was added, and the mixture was heated to 100° C. The mixture was stirred at 100° C. for 2 hours, and then the stirring was stopped. The supernatant liquid was removed by decantation, and further 150 ml of $TiCl_4$ was added. The mixture was stirred at 110° C. for 2 hours. The solid portion was collected by hot filtration, and fully washed with hot kerosene and hexane to give a Ti-containing catalyst component.

The resulting Ti-containing catalyst component contained 4.4% by weight of Ti, 59.0% by weight of Cl, 19.0% by weight of Mg, and 13.0% by weight of ethyl benzoate. It was spherical in shape and had a specific surface area of 207 $m^2/g$.

Polymerization:

A 2-liter autoclave was fully purged with propylene, and then charged with 0.4 millimole of triethyl aluminum, 0.1 millimole of methyl p-toluate and 0.01 mga-tom, calculated as Ti atom, of the Ti-containing catalyst component prepared as above. Propylene (500 g) and $H_2$ under 8 $kg/cm^2$-G were introduced. The mixture was heated and the polymerization was carried out at 80° C. for 1 hour. Then, over 30 minutes, the pressure was released and the temperature was lowered. Analysis showed that the resulting white powdery polymer contained 2.4 ppm of Ti and 24.5 ppm of the esters. 0.1 millimole of triethylaluminum diluted with 25 ml of hexane was added to the polymer, and the mixture was stirred at 60° C. for 1 hour. It was found that the white powdery polymer contained 1.2 ppm of the esters.

EXAMPLE 12

Preparation of a Ti-containing catalyst component:

95.3 g of commercially available magnesium chloride (water content 0.2%), 488 ml of n-decane and 464.5 ml of 2-ethylhexanol were reacted at 130° C. for 2 hours to form a uniform solution. Then, 22.88 ml of ethyl benzoate was added. The uniform solution was added dropwise to 4 liters of titanium tetrachloride maintained at −20° C. over 20 minutes with stirring, and the mixture was further stirred at −20° C. for 1 hour. The mixture was gradually heated, and when the temperature reached 80° C., 48.6 ml of ethyl benzoate was added. The mixture was stirred at 80° C. for 2 hours. The solid substance was collected by filtration, and again suspended in 4 liters of titanium tetrachloride. The suspension was stirred at 90° C. for 2 hours, and filtered to collect the solid substance. The solid substance was washed fully with purified hexane until no free titanium compound was detected in the wash liquid. The resulting titanium-containing component contained 3.6% by weight of titanium, 59.0% by weight of chlorine, 17.0% by weight of magnesium and 15.0% by weight of ethyl benzoate, and had a specific surface area of 230 $m^2/g$.

Polymerization:

Purified hexane (0.75 liter) was put into a 2-liter autoclave, and the inside of the autoclave was fully purged with propylene. The autoclave was then charged with 0.50 millimole of triethyl aluminum, 0.25 millimole of sesquialuminum chloride, 0.15 millimole of ethyl toluate and 0.015 mg-atom, calculated as Ti atom, of the Ti-containing catalyst component prepared as above. Subsequently, 250 Nml of hydrogen was introduced into the autoclave, and the temperature was raised. At 45° C., a gaseous mixture consisting of 89.03 mole% of propylene, 3.67 mole% of ethylene and 4.60 mole% of butene-1 was fed into the autoclave. Polymerization of the gaseous mixture was performed for 2 hours while maintaining a temperature of 55° C. and a pressure of 2.5 $kg/cm^2$-G. A part of the polymer slurry was collected by filtration, and dried. The resulting white powdery polymer was analyzed and found to contain 2.5 mole% of ethylene, 2.9 mole% of butene, 4.5 ppm of Ti and 13.8 ppm of the esters.

After the pressure was released, 0.15 millimole of triethylaluminum was added to the polymer slurry, and the mixture was stirred at 50° C. for 1 hour. The slurry was filtered, and dried to give a white powdery polymer which was found to contain 0.6 ppm of the remaining esters.

Test for odors:

The white powdery polymers obtained in Examples 1 to 12 were dried at 70° C. under reduced pressure for 16 hours, and then tested organoleptically for an odor. The results are shown in Table 2. It is seen that when the polymers were not treated with organometallic compounds, all of them gave off strong odors (evaluated as E).

TABLE 2

| Example | Before treatment | After treatment |
|---------|------------------|-----------------|
| 1       | E                | B               |
| 1'(*)   | E                | A               |
| 2       | E                | B               |
| 3       | E                | B               |
| 4       | E                | B               |
| 5       | E                | C               |
| 6       | E                | B               |
| 7       | E                | B               |
| 8       | E                | B               |
| 9       | E                | B               |
| 10      | E                | B               |
| 11      | E                | C               |
| 12      | E                | B               |

(*): In Example, the polymer treated with the organometallic compound was then treated with steam.

The test results were evaluated on the following scale.
A: No odor perceived.
B: Scarcely any odor perceived.
C: Slight odor perceived.
D: Odor perceived.
E: Strong odor perceived.

What is claimed is:

1. A method for treating an olefin polymer to remove organic catalyst component residues contained therein, which comprises contacting an olefin polymer obtained by polymerizing an olefin in the presence of a catalyst composed of (A) a highly active magnesium-containing titanium compound, (B) an organoaluminum compound and (C) a carbonyl- or Si-containing electron donor, with (D) an organometallic compound of a metal of Groups I to II of the periodic table or an organoaluminum compound selected from the group consisting of trialkylaluminum compounds, alkylaluminum halide compounds, alkylaluminum hydride compounds, and alkyllithium aluminum compounds, after the polymerization.

2. The method of claim 1 wherein the organometallic compound (D) is an organometallic compound having a carbon-metal bond containing a metal selected from the group consisting of alkali metals, alkaline earth metals and aluminum.

3. The method of claim 1 wherein the amount of the organometallic compound (D) is about 0.1 to about 50 moles per mole of the electron donor (C).

4. The method of claim 1 wherein the contacting is carried out at a temperature of about 20° C. to about 100° C.

5. The method of claim 1 wherein the electron donor (C) is an electron donor having up to 18 carbon atoms.

6. The method of claim 1 wherein the amount of the electron donor (C) is about 0.01 to about 1 mole per mole of the organoaluminum compound (B).

7. The method of claim 1 wherein component (D) is said organoaluminum compound.

8. The method of claim 7 wherein said organoaluminum compound is a trialkylaluminum compound used in an amount of from about 0.1 to about 10 moles, per mole of the electron donor (C).

9. The method of claim 2 wherein the organometallic compound (D) is selected from the group consisting of alkyllithium compounds, arylsodium compounds, alkylmagnesium compounds, arylmagnesium compounds, alkylmagnesium halides, arylmagnesium halides and alkylmagnesium hydrides wherein the alkyl groups have from 1 to 12 carbon atoms and the aryl groups have from 6 to 20 carbon atoms.

10. The method of claim 1 wherein the highly active magnesium-containing titanium compound (A) is a solid titanium catalyst component containing an amorphous magnesium halide and having a specific surface area of at least 40 $m^2/g$ which is capable of yielding said olefin polymer in an amount of at least 5,000 grams per millimole of the titanium metal.

* * * * *